United States Patent Office 3,356,512
Patented Dec. 5, 1967

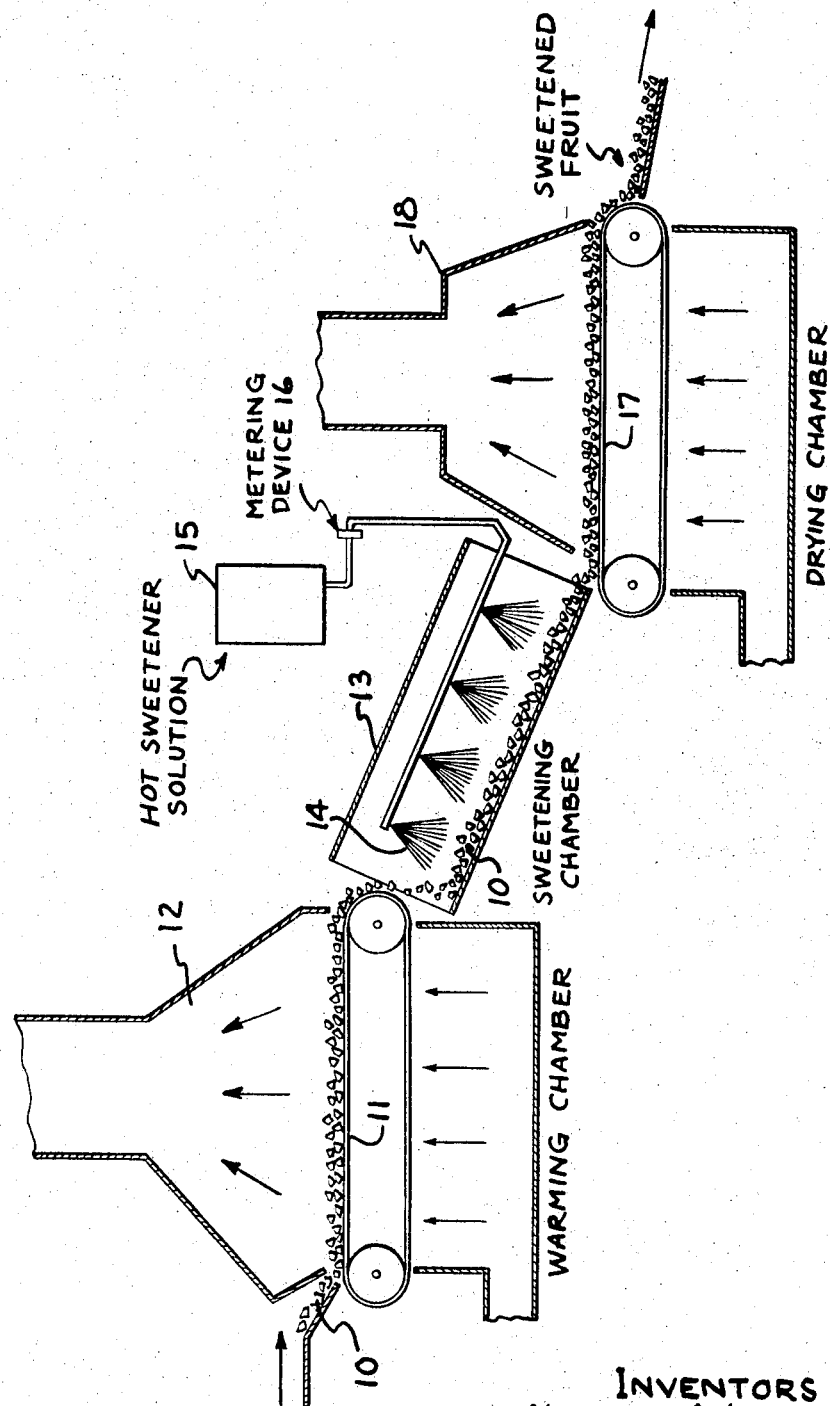

3,356,512
METHOD OF MAKING FREEZE DRIED ARTIFICIALLY SWEETENED FRUIT PRODUCTS
Normand A. Lemaire and Ralph D. Peterson, Battle Creek, Mich., assignors to Kellogg Company, Battle Creek, Mich., a corporation of Delaware
Filed Aug. 18, 1964, Ser. No. 390,283
1 Claim. (Cl. 99—204)

ABSTRACT OF THE DISCLOSURE

This invention relates to the sweetening of fruit, and more particularly to the rapid artificial sweetening of integral pieces of freeze-dried fruit, and to the production thereby of a storage-stable, readily rehydratable product which is uniformly impregnated to a desired level of sweetness.

---

It is an object of the present invention to uniformly impregnate fruit with a sweetening agent in a rapid manner so as to provide a body of discrete fruit particles with a uniform level of sweetness such as, for example, equivalent to 40% by weight of sucrose, to thereby raise the level of the fruit to a uniform and desired degree of sweetness regardless of the climatic, geographical or seasonal conditions of growth and harvest of the fruit.

It is a further object of the present invention to sweeten fruit rapidly to a desired degree and in a substantially homogeneous manner while retaining the fruit in the form of "integral pieces," which term is understood herein to mean whole or sliced or wedged fruit as distinguished from mashed fruit.

It is a further object of the present invention to provide integral pieces of freeze-dried fruit which are impregnated, as distinguished from being merely coated with sweetening agent, and which do not have a "snowy" or glazed appearance as a result of surface deposition of sweetener, the sweetener moreover being impregnated within pores of the dried fruit so that it will not be readily washed off upon rehydration with, for example, cream or milk on consumption.

Sucrose has of course been used as a sweetening agent for fruits, and upon long standing in a syrup whole or sliced fruit can become impregnated with the sucrose. However, use of sucrose as a sweetening agent has several technological disadvantages when used to sweeten fruits for freeze drying. Sucrose when used prior to freeze drying lowers the normal freezing point of the fruit, thus causing a loss in drying efficiency since lower vacuum chamber pressures are required for sublimation. Moreover, sucrose may yield an unnatural appearing fruit since surface glazing may occur when the sweetener is applied both prior to and after freeze drying. Artificial sweeteners likewise will yield a glazed fruit upon freeze drying as does sucrose, if applied to the fresh or frozen fruit pieces being treated absent long periods of storage, since rapid impregnation or penetration of integral pieces of fruit is negligible.

Further, attempts for example to bring freeze-dried tart fruit up to a desirable level, such as to 40 percent sucrose by weight, requires employment of high amounts of water such that the freeze-dried fruit will have its texture and rehydration characteristics irreversibly ruined and at best would require refreezing and freeze-drying a second time, an uneconomical procedure, and which still would not bring the product back to its original freeze dried condition, and the rehydration time of the final sweetened product would be substantially increased.

As distinguished from the foregoing, and in accordance with the present invention, the application of artificial sweeteners in a solvent, i.e. water, to freeze-dried fruits will eliminate the foregoing problems. Such treatment appears to be contrary to the basic principles for storing dried fruits. However, it has been further found in accordance with the present invention that proper application of artificial sweeteners to freeze dried fruits will result in negligible moisture increase and still give proper impregnation of the sweetener and retain the storage stability of the product.

Moreover, artificial sweetening agents applied to freeze-dried fruits does not result in glazing, as does sucrose, since the artificial sweetener is able to penetrate the fruit due to the inherent porosity of freeze dried fruit. Further, sweetener when applied to freeze-dried fruit where penetration has occurred, does not dissipate but is carried into the fruit by the rehydration medium, further resulting in a uniformly sweetened fruit product.

The limit of permissible rehydration of freeze-dried fruit with aqueous sweetener has been found to be approximately 6 percent, thus generally prohibiting the use of aqueous solutions of sucrose when it is desired to sweeten the freeze-dried fruit to a level of 40 percent by weight of sucrose equivalent of sweetness. However, with artificial sweetening agents such as sodium cyclamate, calcium cyclamate, saccharin sodium, cyclohexylsulfamic acid and mixtures thereof, which have sweetening power many times greater than that of sucrose, they can thus be applied in adequate amount to bring the fruit up to the desired level of sweetening without incorporation of more than 6 percent by weight of moisture, and this small amount of moisture can be substantially removed by heat to the original moisture content of the freeze-dried fruit, i.e., below about 2.0 percent by weight, without detriment to the rehydration properties of the freeze dried fruit and without necessity for re-freeze drying.

Thus, for example a 13:1 mixture of calcium cyclamate to saccharin sodium has approximately sixty times the sweetness of sucrose. 40 grams of this combination of artificial sweeteners can be dissolved in 100 milliliters of water at 140° F. Thus, for example, peaches sweetened with this combination at a level of 40 percent sucrose equivalent requires the addition of only 3.0 grams of water per 100 grams of freeze-dried peaches. This amount of water can be added in such a manner or removed by heat such that virtually none remains behind in the peach and the quality of the freeze-dried product is not materially altered. Despite the fact that at 140° F. the solubility of sucrose is considerably higher than that for the artificial sweeteners, namely 287.3 grams per 100 milliliters versus 40 grams per 100 milliliters, its relatively low sweetness requires that for the equivalent amount of sweetness 7.7 times as much water must be used as solvent. Thus, the more than 23 percent of water which would thus be added to the freeze-dried product to achieve a 40 percent sweetness level would irreversibly ruin the texture of the freeze-dried peach and consequently the rehydration characteristics.

It will be understood of course that in accordance with the present invention not only sliced peaches but other sliced or wedged or whole raw fruit, such as apples, pears, apricots, strawberries and other berries, may be effectively processed, where it is desired that the integrity of the shape be retained from beginning to end.

As is well known, freeze drying comprises freezing of the product to be dried, disposition of the same in a vacuum chamber, and sublimation of the moisture content with the aid of heat until the product is dried to a moisture content of approximately 2 percent by weight, and preferably less than 1.5 percent by weight.

In a typical example, fresh sliced peaches having a moisture content of about 88 percent by weight were spread out and disposed on shelves in a freeze drying chamber having a shelf temperature of about 250° F. for about 2 to 3 hours, followed by gradual reduction to a temperature on the order of about 120° F. for a total drying cycle of about 8 to 10 hours. The surface temperature of the product was not permitted to rise above 110° and the pressure in the vacuum chamber was approximately 200–600 microns mercury. The ice that sublimed off was condensed in an adjacent chamber wherein the condenser temperature was −30 to −40° F.

The porous freeze-dried fruit is then sweetened by spraying thereover a hot concentrated aqueous solution of artificial sweetener in an amount to bring the fruit up to the desired sweetness level and which will not increase the moisture content beyond approximately 6 percent by weight, followed by heat drying to remove excess moisture and to bring it back to substantially the original freeze-dried moisture content.

In the preferred embodiment of the present invention, the freeze-dried fruit pieces are first subjected to heating as by forcing warm air at approximately 10 percent relative humidity through a bed of the freeze-dried pieces until the fruit temperature has reached approximtely 130–150° F., at which time there is a marked and unexpected decrease in friability of the fruit product without increasing the moisture content.

In another specific embodiment of the present invention the aqueous solution of sweetener is sprayed onto the freeze dried fruit at a temperature above about 212° F. such as for example 220° F., to result in a "flashing" on and into the fruit of the sweetener with substantial evaporation of the moisture so that no further heating or drying may be necessary, although such further drying may be practiced if found necessary to reduce the moisture content to below about 2 percent by weight.

The accompanying drawing diagrammatically illustrates an arrangement of apparatus for carrying out the present invention.

Thus, referring to the drawing, the reference numeral 10 indicates pieces of raw freeze-dried fruit which are spread out onto the endless conveyor belt 11 and carried through a warming chamber 12 wherein the dried fruit is pre-heated to a temperature of 130° to about 150° F., to decrease the friability of the particles and facilitate the subsequent handling. The particles are then passed from the warming chamber 12 onto the endwise open inclined rotating sweetening chamber 13, wherein they are subjected to a spray 14 of aqueous sweetener solution delivered from the chamber 15 in controlled amount by means of the metering device 16. The sweetener solution in chamber 15 is suitably at a temperature of about 220° F. so that as the solution is sprayed onto the particles 10 passing through the sweetening chamber 13 they are simultaneously impregnated with the sweetening agent and the moisture content flashed off so that as they are delivered from the exit end of the sweetening chamber onto the conveyor belt 17, the particles are substantially dry, and may not require any further drying. However, if further drying is required, this is accomplished in the drying chamber 18 through which conveyor belt 17 passes and the particles therein dried by means of hot air at a temperature of from about 125° to about 175° F. and discharged at a moisture content of less than 2 percent and preferably less than 1.5 percent.

The following are suitable examples of compositions of the present invention for the purpose of illustration and not limitation:

EXAMPLE 1

40% relative sucrose equivalent

| | | |
|---|---|---|
| Freeze-dried peach slices | grams | 100 |
| Calcium cylamate | do | 1.114 |
| Saccharin sodium | do | .0832 |
| Water | ml | 4.45 |

EXAMPLE 2

20% relative sucrose equivalent

| | | |
|---|---|---|
| Freeze-dried peach slices | grams | 100 |
| Calcium cylamate | do | 0.557 |
| Saccharin sodium | do | 0.0416 |
| Water | ml | 2.22 |

EXAMPLE 3

40% sucrose equivalent

| | | |
|---|---|---|
| Freeze-dried peach slices | grams | 100 |
| Cyclamic acid (cyclohexylsulfamic acid) | do | 1.114 |
| Saccharin sodium | do | .0832 |
| Water | ml | 4.45 |

EXAMPLE 4

44.1% relative sucrose equivalent

| | | | | |
|---|---|---|---|---|
| Freeze-dried peach slices (gm.) | 100 | 100 | 100 | 100 |
| Calcium cyclamate (gm.) | 1.4858 | 1.4858 | 1.4858 | 1.4858 |
| Saccharin sodium (gm.) | .1142 | .1142 | .1142 | .1142 |
| Water (ml.) | 6.4 | 4.0 | 1.06 | .4 |
| Conc. solution (percent) | 20 | 40 | 60 | 80 |

We claim:

The method of sweetening pieces of fruit in a substantially uniform manner while substantially retaining the integrity of the shapes of said pieces, which comprises subjecting integral pieces of raw fruit to freeze drying to a moisture content of less than about 2% by weight, recovering the resulting porous pieces, impregnating them with a hot aqueous solution of artificial sweetener to a moisture content not greater than about 6% by weight, and heat drying them to substantially the aforesaid freeze-dried moisture content.

References Cited

UNITED STATES PATENTS 2,899,319  8/1959  Powers et al. _____ 99—193 X
3,025,169  3/1962  Guadagni _____ 99—193

HYMAN LORD, Primary Examiner.

A. LOUIS MONACELL, Examiner.

M. VOET, Assistant Examiner.